United States Patent

[11] 3,590,626

| [72] | Inventor | Hans W. Hugli<br>Williamsville, N.Y. |
|---|---|---|
| [21] | Appl. No. | 16,407 |
| [22] | Filed | Mar. 4, 1970 |
| [45] | Patented | July 6, 1971 |
| [73] | Assignee | Kistler Instrument Corporation<br>Clarence, N.Y. |

[54] SINUSOIDAL PRESSURE CALIBRATOR
17 Claims, 3 Drawing Figs.

[52] U.S. Cl. ................................................. 73/4,
310/8.1, 310/8.4, 310/8.7
[51] Int. Cl. .................................................. G01l 27/00
[50] Field of Search ........................................ 310/8.1,
8.4, 8.7, 8.3; 73/4, 4 D, 1 D, 1 DV

[56] References Cited
UNITED STATES PATENTS
3,121,211  2/1964  Eskin et al. .................... 73/1
2,498,737  2/1950  Holden ......................... 310/8.7 X
3,033,027  5/1962  Peuls et al. ................... 310/8.7 X

*Primary Examiner*—Milton O. Hirshfield
*Assistant Examiner*—B. A. Reynolds
*Attorney*—Le Blanc & Shur

ABSTRACT: Disclosed is a dynamic pressure calibrator for calibrating particularly piezoelectric pressure transducers for relatively high and rapid sinusoidal pressure variations. The calibrator comprises a housing on which are mounted both a standard and a test transducer. A seismic mass of known weight within the housing is vibrated when the device is placed on a shaker table and acts through a piston and a hydraulic oil reservoir in the housing to simultaneously apply equal pressure forces to the transducers so their outputs can be compared. An accelerometer senses seismic mass acceleration and the transducers are preferably preloaded through the oil.

INVENTOR
HANS W. HUGLI

BY LeBlanc & Shur
ATTORNEYS

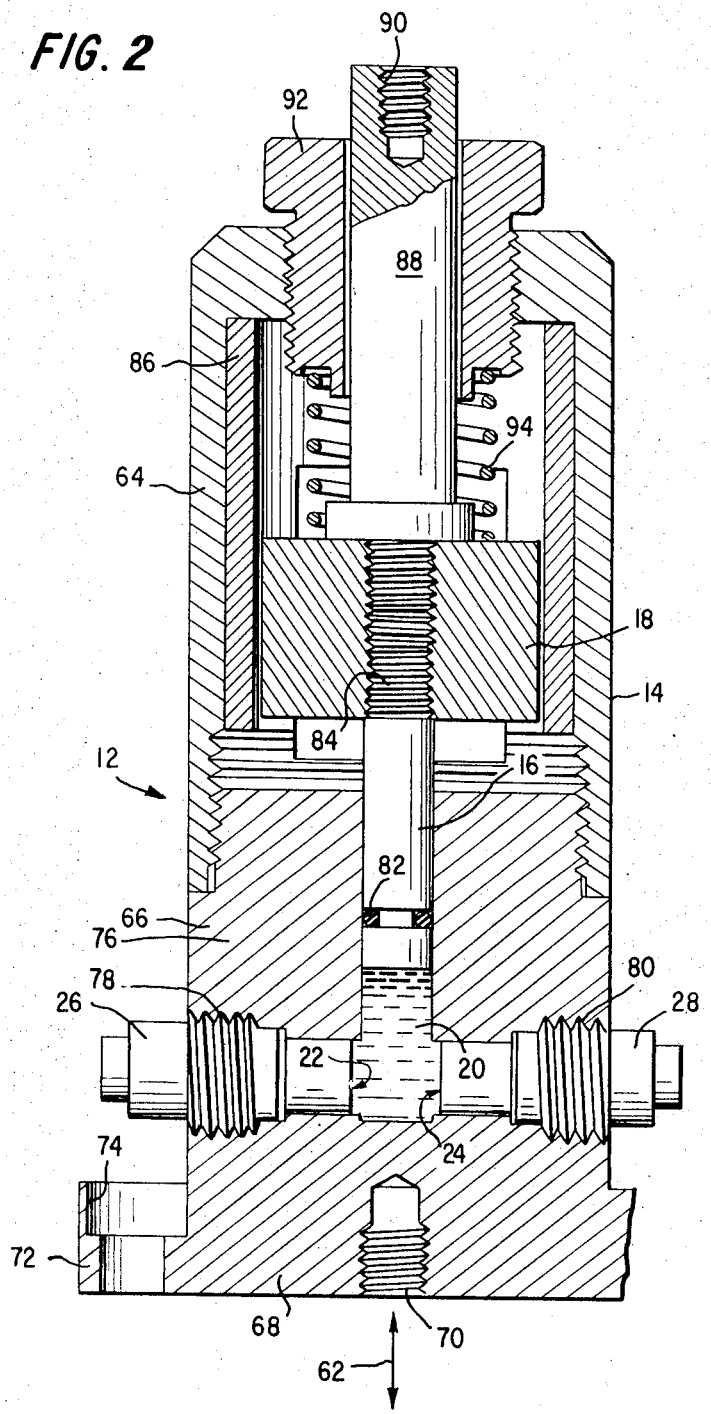

SINUSOIDAL PRESSURE CALIBRATOR

This invention relates to a dynamic pressure calibrator and more particularly to a sinusoidal calibrator for calibrating pressure transducers under dynamically varying pressure conditions. The device of the present invention is particularly suited to the calibration of piezoelectric transducers used to produce an electrical output signal in response to an input fluid pressure.

Piezoelectric pressure transducers are well known and are used in a variety of applications for sensing the pressure of a pressure fluid. Because of their ruggedness and reliability, they are particularly suited for measuring pressures in severe environments, such as those accompanying explosions, and are widely used for measuring pressures of internal combustion engines and for measuring the overpressures occurring during thermonuclear and other explosions. In addition, piezoelectric transducers have been used extensively in measuring the pressures from rocket engines.

Piezoelectric transducers are customarily statically calibrated by applying known weights to the piezoelectric material of the transducer and determining the electrical response or output signal representative of the known weight. However, static calibration does not indicate the true response of the transducer under all possible conditions since a certain amount of charge inevitably leaks off the surfaces of the piezoelectric material during calibration and the static calibration does not account for all loading factors to which the transducer may be subjected during dynamic variations in a pressure fluid being monitored. For this reason, it is desirable that the transducer be calibrated not only statically but also in response to pressure variations and particularly sinusoidally varying pressures.

Difficulties have been encountered in the past in attempting to dynamically calibrate piezoelectric pressure transducers because of the relatively high pressures involved and the rapid changes in pressure that may occur during actual use. In order to calibrate the piezoelectric transducers under rapidly varying high pressure conditions, it has been necessary to provide elaborate and expensive hydraulic source and valving systems capable of producing and accurately controlling the pressure fluids applied to the transducer.

The present invention avoids these and other difficulties by providing a simplified and inexpensive and yet highly accurate system for dynamically calibrating pressure transducers and particularly piezoelectric transducers for sensing rapidly varying, relatively high pressures. In particular, the system of the present invention makes it possible to rapidly calibrate a piezoelectric pressure transducer for sinusoidal variations in the applied pressure fluid, thus more closely simulating the actual operating conditions to which the transducer may be subjected. In the present invention, the calibrator is constructed to compare the electrical output of a standard pressure transducer with the output of an unknown test transducer subjected to identical sinusoidal pressure. The sinusoidal pressure is produced by means of a vibrating piston-mass system acting by way of a hydraulic fluid, such as oil, on the operating faces or diaphragms of the two pressure transducers simultaneously.

A known mass is vibrated at a g-level which is accurately calibrated and a piston attached to the mass exerts a known pressure through hydraulic oil to the two pressure transducers. Since according to the formula $F=MA$, the pressure acting on the unknown transducer is proportional to the known mass and the calibrated acceleration or g-level divided by the area of the working face of the mass, the output signal from the transducer can be accurately calibrated. This traceable dynamic pressure calibration complements the well established static pressure calibration to provide an accurate pressure standard.

The sinusoidal calibrator comprises a two-piece housing in one portion of which is received a metered amount of hydraulic fluid, such as oil. Mounted in the other section of the housing is a movable mass which acts through a sliding piston to vary the pressure acting on the fluid. Coupled to the fluid chamber are a pair of pressure transducers, one constituting a previously calibrated standard pressure transducer and the other an unknown test transducer to be calibrated, such that the fluid acts simultaneously with equal force on both pressure transducers.

The movable mass is preferably preloaded by a suitable spring to apply a preload pressure to the hydraulic fluid and mounted on the mass is an accelerometer for sensing acceleration of the mass and connected piston system. The calibrator is mounted on a conventional shaker table which preferably undergoes simple harmonic reciprocating motion so as to provide a sinusoidal variation in the acceleration of the mass-piston system which in turn sinusoidally varies the pressure applied through the hydraulic fluid to the two pressure transducers. The two transducers and the accelerometer coupled to the movable or seismic mass are connected through suitable electrical circuits to a meter or oscilloscope for displaying and calibrating the electrical output of the unknown test transducer.

It is therefore one object of the present invention to provide an improved dynamic pressure calibrator.

Another object of the present invention is to provide a sinusoidal calibrator for piezoelectric pressure transducers.

Another object of the present invention is to provide a pressure calibrator in which a seismic mass acts simultaneously through a pressure fluid on both a standard and a test pressure transducer.

Another object of the present invention is to provide a sinusoidal pressure transducer in which a seismic mass is physically accelerated by a shaker table to apply varying pressure forces on a pressure transducer to be calibrated.

Another object of the present invention is to provide a simplified and inexpensive calibrator for accurately calibrating pressure transducers under the influence of rapidly varying, relatively high pressure fluids.

These and other objects and advantages of the invention will be more apparent upon reference to the following specification, claims, and appended drawings, wherein:

FIG. 2 is a vertical cross section through a pressure calibrator constructed in accordance with the present invention.

Figure 1:
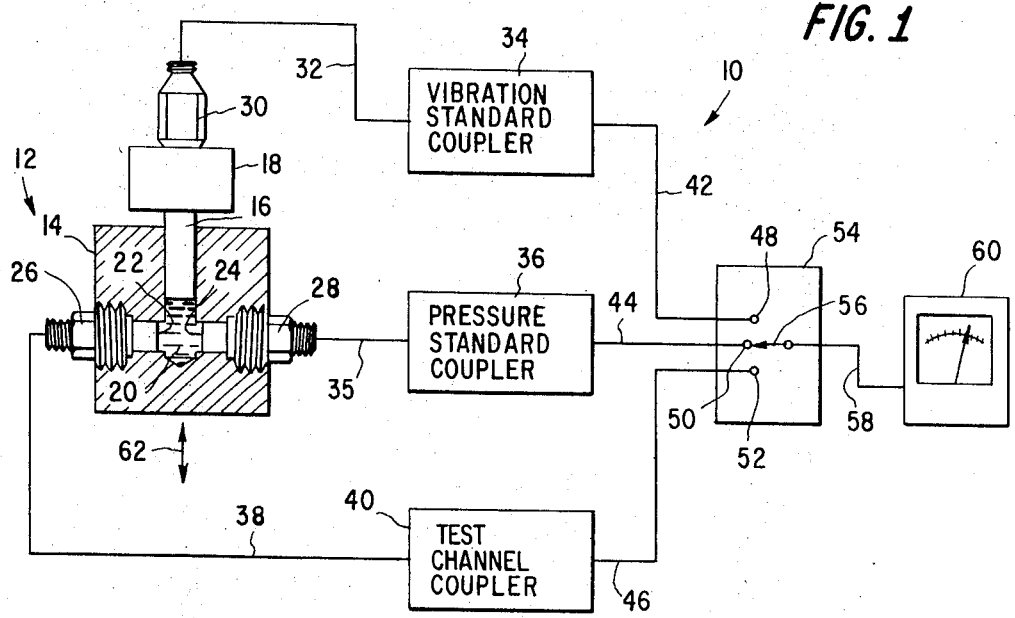
FIG. 1 is a diagrammatic view of the overall pressure calibrating system of the present invention.

Referring to the drawings, the overall calibration system of the present invention is generally indicated at 10 in FIG. 1 and comprises a calibrator 12 including a housing 14 which slidably receives a pressure-applying piston 16. Piston 16 has secured to it a known seismic mass 18 and acts through a pressure fluid 20 in the housing on the working faces 22 and 24 of a pair of pressure transducers 26 and 28. In the embodiment shown, transducer 28 is preferably a standard pressure transducer, while transducer 26 is an unknown test transducer to be calibrated by the system.

Mounted on known mass 18 is a piezoelectric accelerometer 30 which has its output connected by lead 32 to a vibration standard coupler 34. The output of standard transducer 28 is connected by lead 35 to pressure standard coupler 36 and the output of test transducer 26 is connected by lead 38 to a test channel coupler 40. Each of the couplers may be a charge or voltage amplifier for receiving the transducer or accelerometer output. Vibration standard coupler 34 and pressure couplers 36 and 40 are preferably calibrated respectively to produce an output of 10 mv./g. and 10 mv./p.s.i. By way of example only, accelerometer 30 may be of the type shown and described in assignee's U.S. Pat. No. 3,351,787 and transducers 26 and 28 may be of the type described in assignee's U.S. Pat. No. 3,349,259, although it is understood that almost any type of conventional accelerometer may be used for the accelerometer 30 and any conventional type of pressure transducer may be used for the transducers 26 and 28.

The outputs from couplers 34, 36 and 40 are fed by respective leads 42, 44 and 46 to respective input terminals 48, 50, and 52 of a selector switch 54. The movable contact 56 of the switch is connected by lead 58 to a meter 60 for displaying the output from one of the couplers 34, 36, and 40, dependent upon the position of movable contact 56. While a meter 60 is shown, it is understood that it may be replaced by other monitoring equipment, such as an oscilloscope or the like.

In operation, the housing 14 of the calibrator 12 is placed on a shaker table and vibrated by simple harmonic reciprocating motion as indicated by the double-ended arrow 62 in FIG. 1. Reciprocation of the housing 14 causes the piston 16 and attached mass 18 and accelerometer 30 to move relative to the housing so as to sinusoidally vary the pressure applied by the piston under the weight of mass 18 to the fluid 20. In this way the fluid 20, which by way of example only may be hydraulic oil, applies a sinusoidal pressure simultaneously to the working faces 22 and 24 of the respective transducers 26 and 28. The acceleration g level may be ascertained by moving contact 56 of selector switch 54 into engagement with terminal 48 so that the output of accelerometer 30 is read on meter 60. By moving the contact to the central position illustrated in FIG. 1, meter 60 is connected to coupler 36 to indicate the output of the standard pressure transducer 28. Finally, by manually moving contact 56 into engagement with lower terminal 52, the test transducer 26 is connected through coupler 40 to the meter and its output displayed.

The pressure applied by the mass 18 may be ascertained according to the following equation:

$$P_r = \frac{F}{A} = \frac{m \cdot a}{A} = \frac{\frac{W}{g} \cdot a}{A} = \frac{W \cdot a}{A \cdot g} \qquad (1)$$

where $F$ is the acceleration force, $m$ is the seismic mass, $a$ is the acceleration and $A$ is the area of the piston. By way of example only, assuming a total mass for the seismic system of 150 gr., a piston diameter of 0.635 cm. and a seismic mass acceleration of 10 g.'s, the pressure acting on the transducer is 4.75 at.

FIG. 2 is a more detailed vertical section through the calibrator 12 of FIG. 1 and like parts bear like reference numerals. The calibrator comprises a housing 14 having an upper section 64 threaded over a lower section 66. Lower section 66 comprises a base 68 having a central threaded hole 70 for mounting to a shaker table and an annular flange 72 having a plurality of mounting holes 74 providing for alternative mounting to a shaker table. Extending upwardly from base 68 is a tubular body 76 threadedly receiving as at 78 and 80 the respective transducers 26 and 28. These transducers may be provided with suitable seals (not shown) for sealing in the fluid 20 which acts on the transducer working faces 22 and 24.

Slidably received in the upper end of tubular body 66 is the lower end of piston 16 which carries a sealing O-ring 82 and is threaded at its upper end as at 84 into a central aperture in the seismic mass 18. This seismic mass is mounted in the upper section 64 of the housing 12 and is spaced from the housing walls by a Teflon sleeve 86. Threaded into the upper end of seismic mass 18, which by way of example only may be made of tungsten, is an accelerometer mounting pin 88 internally threaded as at 90 to receive the accelerometer 30 of FIG. 1.

Threaded into the upper end of upper section 64 of the housing is a preload adjustment plug 92 which acts through a preload or compression spring 94 coiled about mounting pin 88 to apply a predetermined preload or compression force through the seismic mass and piston to the hydraulic fluid 20.

Figure 3:
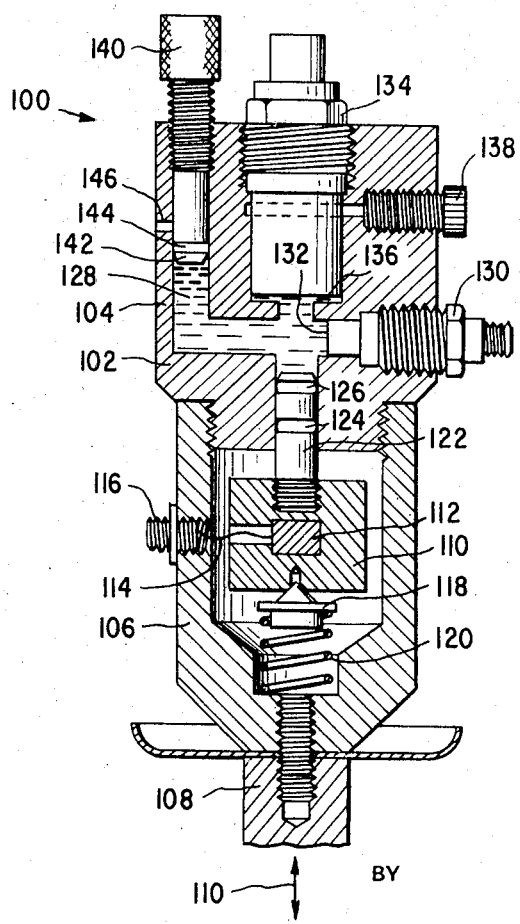
FIG. 3 is a vertical cross section through a modified calibrator constructed in accordance with the invention.

FIG. 3 is a vertical cross section through a modified calibrator constructed in accordance with the present invention and generally indicated at 100. The calibrator again comprises a housing 102 made up of an upper section 104 threadedly received within a lower section 106. Calibrator 100 is illustrated in FIG. 3 as mounted on a shaker table 108 which is driven in a conventional manner to undergo simple harmonic reciprocating motion as indicated by the double ended arrow 110 in FIG. 3.

Mounted in lower section 106 of the housing is a preferably tungsten seismic mass 110 which has built into it an accelerometer as diagrammatically indicated at 112. The output of the accelerometer 112 is connected by flexible lead 114 to a connector 116 threaded into the sidewall of lower housing section 106. Pressing against the underside of seismic mass 110 is a preloading plug 118 which is urged by helically coupled compression spring 120 bearing against the lower end of housing section 106.

Threaded into the upper end of the seismic mass 110 is a piston 122 provided with sealing O-rings 124 and 126, which piston is slidable through a central circular aperture in the upper housing section 104. The upper end of the piston communicates with a chamber in the housing filled with hydraulic fluid in the form of oil as indicated at 128. Threaded into the sidewall of section 104 is a standard pressure transducer 130 having its working face 132 in contact with the oil 128. Finally, threaded into the upper end of top section 104 of the housing is test transducer 134, also having its working face 136 in communication with oil 128.

Upper section 104 of the housing is provided with an air vent screw 138 for venting the space about transducer 134 and with the pressure adjustment screw 140 which acts at its lower end 142, sealed by sealing ring 144, to provide for fine manual adjustment of the pressure of hydraulic oil 128. Finally, the space about the adjustment screw 140 is vented by an air vent 146.

The operation of the embodiment of the calibrator shown in FIG. 3 is identical to that previously described. In particular, the hydraulic oil 128 is preloaded by the coil spring 120 and when the shaker table 108 is driven, the seismic mass and piston act to cyclically vary in a sinusoidal manner the pressure of oil 128 acting on the working faces 132 and 136 of the standard transducer 130 and test transducer 134, respectively. The calibrator 100 is connected in the circuit of FIG. 1 in the same manner as the calibrator 12 shown in that figure.

It is apparent from the above that the present invention provides a simplified, inexpensive, and yet highly accurate and reliable calibrator for sinusoidally calibrating pressure transducers and particularly piezoelectric pressure transducers which may in operation be subjected to relatively high and rapidly varying pressures. Important features of the calibrator include the provision of a seismic mass reciprocally movable in a housing mounted on a shaker table for sinusoidally varying the pressure of a hydraulic fluid such as oil which acts simultaneously on the working faces of both a standard pressure transducer and a test pressure transducer. The acceleration of the seismic mass and its associated structure is determined by the output of an accelerometer mounted on the seismic mass as in FIG. 1 or formed integrally and internally of the seismic mass as in the embodiment of FIG. 3. Provision is made for adjusting the preload force by manual manipulation of the preload plug 92 in FIG. 2 or by manually adjusting the pressure in the embodiment of FIG. 3 by operation of the pressure adjustment screw 140. The two-piece housing assembly makes it possible to place into the calibrator an amount of hydraulic fluid, such as oil, and to subsequently connect the two sections together to complete the calibrator assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to be secured by United States Letters Patent is:

1. A dynamic pressure calibrator comprising a housing for attachment to a shaker table, said housing including a cavity adapted to receive a pressure fluid, means on said housing for mounting a test pressure transducer with its working face in fluid communication with said cavity, a seismic mass mounted in said housing, and a piston connected to said mass and having one end in fluid communication with said cavity for applying a variable pressure force through the fluid in said cavity to the working face of said test transducer.

2. A pressure calibrator according to claim 1 including a piezoelectric test transducer on said mounting means with its working face in fluid communication with said cavity.

3. A pressure calibrator according to claim 1 including an accelerometer connected to said seismic mass for indicating the acceleration of said mass.

4. A pressure calibrator according to claim 3 wherein said accelerometer is a piezoelectric accelerometer.

5. A pressure calibrator according to claim 3 including means in said housing for applying a preloading force to said mass and piston.

6. A pressure calibrator according to claim 5 wherein said preloading means comprises a spring urging said mass and piston toward said cavity.

7. A dynamic pressure calibrator comprising a housing for attachment to a shaker table, said housing including a cavity adapted to receive a pressure fluid, first means on said housing for mounting a test pressure transducer with its working face in fluid communication with said cavity, second means on said housing for mounting a standard pressure transducer with its working face in fluid communication with said cavity, a seismic mass of known weight mounted in said housing, a piston connected to said mass and having one end in fluid communication with said cavity for simultaneously applying a variable pressure force through the fluid in said cavity to the working face of each of said transducers, and means in said housing for coupling an accelerometer to said seismic mass for sensing its acceleration.

8. A pressure calibrator according to claim 7 including a piezoelectric accelerometer coupled to said seismic mass.

9. A pressure calibrator according to claim 8 wherein said accelerometer is received within said seismic mass.

10. A pressure calibrator according to claim 8 wherein said accelerometer is mounted on a rod connected to said seismic mass and extending through an aperture in said housing.

11. A dynamic pressure calibrator comprising a two-piece housing having first and second sections connected together, means on one of said sections for connecting said housing to a shaker table, one of said sections including a cavity filled with hydraulic oil, a piezoelectric test pressure transducer mounted on said one section with its working face in contact with said oil, a piezoelectric standard pressure transducer mounted on said one section with its working face in contact with said oil, a seismic mass movably mounted in the other of said sections, a piston connected to said seismic mass and extending into said one section with its end contacting said oil for simultaneously applying a variable pressure force through said oil to the working face of each of said transducers, resilient preloading means in said other section urging said mass and piston toward said oil, and a piezoelectric transducer connected to said seismic mass for sensing its acceleration.

12. A pressure calibrator according to claim 11 wherein said means for connecting said housing to a shaker table is on the housing section containing said oil.

13. A pressure calibrator according to claim 11 wherein said means for connecting said housing to a shaker table is on the housing section containing said seismic mass.

14. A pressure calibrator according to claim 11 including an adjustable preload plug threaded into said other section, said resilient preloading means comprising a helical spring compressed between said plug and said seismic mass.

15. A pressure calibrator according to claim 11 including a pressure adjustment screw threaded into said one section, said screw having its inner end in contact with said oil.

16. A pressure calibrator according to claim 11 including a selector switch to the output of both of said transducers and to the output of said accelerometer, and display means connected to said switch for selectively displaying one of said outputs.

17. A pressure calibrator according to claim 16 wherein said switch is coupled to said transducers and accelerometer through respective coupler amplifiers.

UNITED STATES PATENT OFFICE
CERTIFICATE OF CORRECTION

Patent No. 3,590,626    Dated July 6, 1971

Inventor(s) Hans W. Hugli

It is certified that error appears in the above-identified patent and that said Letters Patent are hereby corrected as shown below:

In Column 4, lines 8 and 9, "helically coupled" should read --helically coiled--. In Column 6, line 31, Claim 16, "switch to" should read --switch coupled to--.

Signed and sealed this 14th day of December 1971.

(SEAL)
Attest:

EDWARD M. FLETCHER, JR.
Attesting Officer

ROBERT GOTTSCHALK
Acting Commissioner of Patents